United States Patent [19]
Damm et al.

[11] Patent Number: 5,789,707
[45] Date of Patent: Aug. 4, 1998

[54] SEALING DEVICE

[75] Inventors: Jesper Damm, Kessel-Lo; Jean-Marie Etienne Nolf, Korbeek-Lo; Maarten Michiels, Kortenberg; Etienne Laeremans, Scherpenheuvel-Zichen, all of Belgium

[73] Assignee: N.V. Raychem S.A., Belgium

[21] Appl. No.: 652,517

[22] PCT Filed: Nov. 30, 1994

[86] PCT No.: PCT/GB94/02622

§ 371 Date: May 31, 1996

§ 102(e) Date: May 31, 1996

[87] PCT Pub. No.: WO95/15600

PCT Pub. Date: Jun. 8, 1995

[30] Foreign Application Priority Data

Dec. 1, 1993 [GB] United Kingdom ............... 9324612
Apr. 7, 1994 [GB] United Kingdom ............... 9406862
Sep. 21, 1994 [GB] United Kingdom ............... 9419022

[51] Int. Cl.$^6$ ................................................ H02G 3/18
[52] U.S. Cl. ............................ 174/65 SS; 174/77 R; 285/12; 285/177
[58] Field of Search ................... 174/65 R, 65 G, 174/65 SS, 151, 152 G, 153 G, 135, 77 R, 93; 285/12, 177; 248/56; 16/2.1, 2.2, 2.5; D8/356; 277/101, 102, 192, 148, 154, 3, 103, 106, 107, 108

[56] References Cited

U.S. PATENT DOCUMENTS

| | | | |
|---|---|---|---|
| 843,230 | 2/1907 | McCarthy | 277/106 |
| 2,165,926 | 7/1939 | Greene | 285/177 X |
| 2,288,158 | 6/1942 | Ellinwood | 174/135 |
| 2,311,758 | 2/1943 | Johansson | 174/65 SS |
| 3,830,954 | 8/1974 | Caudill | 248/56 X |
| 4,295,005 | 10/1981 | Daugherty et al. | 174/135 X |
| 4,431,198 | 2/1984 | Beinhaur et al. | 174/65 R |
| 4,480,860 | 11/1984 | Foresta et al. | 285/177 |
| 4,733,016 | 3/1988 | Twist et al. | 174/65 R |
| 4,954,098 | 9/1990 | Hollingsworth et al. | 439/404 |
| 4,963,698 | 10/1990 | Chang et al. | 174/77 R |
| 5,234,185 | 8/1993 | Hoffman et al. | 248/56 |
| 5,539,152 | 7/1996 | Gretz | 174/65 R |

FOREIGN PATENT DOCUMENTS

| | | | |
|---|---|---|---|
| 278544 | 8/1988 | European Pat. Off. | 174/65 G |
| 2654182 | 5/1991 | France | 248/56 X |
| 2 660 118 | 9/1991 | France | |
| 19 39 312 | 2/1970 | Germany | |
| 3428258 | 2/1986 | Germany | 174/65 R |
| 91 07 914 | 9/1991 | Germany | |
| 630688 | 4/1978 | U.S.S.R. | 174/151 X |
| WOA90 05401 | 5/1990 | WIPO | |

Primary Examiner—Bot L. Ledynh
Assistant Examiner—Dean A. Reinhard
Attorney, Agent, or Firm—Herbert G. Burkard

[57] ABSTRACT

A device for forming a seal around an elongate object having: (a) a sealing plate having a hole through which the object can pass, and containing a chamber in communication with the hole; (b) a pressure plate positioned within and movable relative to the chamber; and (c) a sealing material positioned within the chamber such that when the elongate object passes, in use, through the hole in the sealing plate, the sealing material is positioned between the pressure plate and the elongate object, wherein the pressure plate can be moved, in use, towards the object in a direction transversely of the object, to urge the sealing material into sealing contact with the object.

12 Claims, 12 Drawing Sheets

SEALING DEVICE

BACKGROUND OF THE INVENTION

The present invention relates to a sealing device for sealing around elongate objects, and particularly to a sealing device suitable for use as an end plate which can be used in combination with a sleeve to form a closure assembly for enclosing an elongate substrate such as a splice between telecommunications cables.

The invention is described primarily in terms of a sealing device for sealing around elongate objects in the form of cables or joints between cables. However it is also applicable for sealing around other elongate objects, in particular pipes or joints therebetween.

It is often necessary to make seals around cables or other elongate objects for example to prevent moisture or other contaminants having access to part of the elongate object. In particular it is necessary to provide environmental seals for cable systems, such as telecommunication cable systems. It is often necessary to make splices in such cables, either to join cables end to end or to make a branch joint in a cable. Such splices may be protected by splice cases.

Known splice cases may comprise an outer member surrounding the splice and at least one end seal device through which the cable can enter the splice case. The end seal device must provide a good seal around the cable and a good seal to the splice case. Splice cases are in general expected to have a life-time comparable to that of the cables they join, say twenty years. Achieving a high level of environmental and mechanical protection over such lengths of time puts considerable constraints on design.

International patent specification WO90/05401 (Raychem) discloses a closure assembly for an elongate object. A preferred embodiment of WO90/05401 describes a closure assembly comprising two end plates which are spaced apart within an outer sleeve, and which each have at least one opening for receiving the elongate object. A sealing material is located between the plates and the plates are moved relative to each other to compress the sealing material so as to displace it to give maximum contact between the sealing material and (a) the outer sleeve and (b) the elongate object. After the closure assembly has been placed around the elongate object in the arrangement of WO90/05401, all the movement required to compress the sealing material is obtained by moving an end plate through which the elongate object passes.

It is desirable for the end plates to provide strain relief to elongate objects passing through them. This may be achieved by designing the end plates to grip the cable or other elongate object passing through them as firmly as possible so that forces applied to the elongate object are resisted by the end plates rather than by any connectors joining individual conductors of the cable. While the assembly of WO90/05401 is very successful in forming a seal around elongate objects it does require relative movement between one or more of the end plates and the elongate object(s)(s) passing therethrough, and this movement may be incompatible with design features of the end plates desirable to optimise grip of the end plates on to the elongate objects.

SUMMARY OF THE INVENTION

We have designed a new device for forming a seal around an elongate object which comprises a sealing plate through which an elongate object can pass but which does not require relative movement between the plate and the elongate object. The invention, therefore, allows more freedom for the designer to provide various features on the sealing plate, for example for strain relieving elongate objects passing therethrough.

A first aspect of the present invention provides a device for forming a seal around an elongate object comprising:

(a) a sealing plate having a hole through which the object can pass, and containing a chamber in communication with the said hole;

(b) a pressure plate positioned within, and movable relative to the chamber; and (c) a sealing material positioned within the chamber such that when the elongate object passes, in use, through the hole in the sealing plate, the sealing material is positioned between the pressure plate and the elongate object, wherein the pressure plate can be moved, in use, towards the elongate object in a direction transversely of the object, to urge the sealing material into sealing contact with the object.

Preferably the chamber in the sealing plate surrounds at least part of the periphery of the hole in the sealing plate.

The use of a pressure plate acting in a chamber that is in communication with, and surrounds at least part of the periphery of the hole, is novel per se regardless of the direction of movement of the pressure plate.

A second aspect of the invention therefore provides a device for forming a seal around an elongate object comprising:

(a) a sealing plate having a hole through which the object can pass, and containing a chamber in communication with the said hole, and surrounding at least part of the periphery of the hole;

(b) a pressure plate positioned within and movable relative to the chamber; and (c) a sealing material positioned within the chamber such that when the elongate object passes, in use, through the hole in the sealing plate, the sealing material is positioned between the pressure plate and the elongate object, wherein the pressure plate can be moved, in use, to urge the sealing material into sealing contact with the object.

A third aspect of the invention provides a device for forming a seal around an elongate object comprising:

(a) first and second sealing members each having at least one aperture defining a path for an elongate object through the sealing device;

(b) a sealing material between the sealing members; and (c) means for pressurizing the sealing material which can pressurize the sealing material without moving the sealing members relative to the elongate object.

The first and second sealing members of the device according to the third aspect of the invention preferably together comprise a sealing plate. The sealing material between the sealing members is preferably contained in a chamber which is located between the sealing members.

The sealing device according to each aspect of the invention is preferably suitable for forming an end plate of a closure assembly comprising a sleeve and one or two of said end plates.

Another aspect of the invention provides a closure assembly comprising a sleeve and an end plate, or preferably two end plates according to the first, second or third aspect of the invention. The end plate is preferably sealed within the ends of the sleeve in use.

In a preferred embodiment according to the invention the sealing plate comprises two or more parts, separable along a line that divides the hole. The sealing member may comprise, for example two half shells, with mating, substantially flat surfaces, each of which is provided with a channel. When the surfaces are positioned to abut each other the channels cooperate to provide a passageway for receiving the elongate object. Each half shell may comprise, for example, a plate that is substantially semi-circular in cross-section.

An important advantage of the use of a divided sealing plate is that the device is then re-enterable. The term re-enterable means that the closure can be reopened to allow access to the elongate substrate generally without destruction or removal of the entire assembly. In the present application, where the sealing plate is divided into parts, it is possible to separate and reposition the parts of the plate again and again, if it is desired to remove or replace the elongate object within the sealing plate.

Preferably the configuration of the sealing plate and the chamber are such that as the pressure plate is moved towards the elongate object(s) the edges of the pressure plate substantially follow the inner walls of the chamber. This means that substantially all the sealing material is thereby urged towards the elongate object, with substantially no escape or egress of the sealing material around the edges of the pressure plate into the part of the chamber from which the pressure plate has been moved. The effect of this is that the movement of the pressure plate first urges the sealing material into contact with the elongate object and then compresses the sealing material. This is particularly advantageous when the sealing material is a gel. Preferred compositions for the sealing material are described in more detail later.

The pressure plate is preferably operable by hand externally of the device. The device is preferably configured to permit this external operation. For example the device may comprise a passageway communicating from the chamber to the outside of the device, and an operating rod may extend from the pressure plate through the passageway to the outside of the device, where it can be operated by hand to make the required movement of the pressure plate.

The device is preferably provided with a resilient member arranged resiliently to bias the pressure plate against the sealing material. This is preferably included in addition to any member, for example operating rod, which may be included to effect the hand operated movement of the pressure plate. The resilient biasing member is desirable since it provides a constant application of pressure onto the sealing means during the lifetime of the device. This is in addition to the pressure which is applied to the sealing means by movement of the pressure plate during the installation of the device. The resilient member may be a spring or the like.

In preferred embodiments of the third aspect of the invention, the sealing means between which the sealing material is maintained may, for example, be made of substantially rigid mouldings of plastics materials. The sealing device may be provided with spacers to maintain the sealing members at a fixed distance from one another and to give greater rigidity to the combination of sealing members than would be possible if the sealing members were free to move relative to each other.

Pressurization of the sealing material will usually result in its mere displacement into sealing contact with the elongate object and the device and/or other component such as a sleeve or casing to be used with the device. The sealing material may then be maintained under pressure by some resilient bias means associated with the means for pressurizing the sealing material. The sealing material may however be reduced in volume and if it is compressible in that sense it may provide its own resilient bias.

The means for pressurizing the sealing material according to the third aspect of the invention is preferably one or more pressure plates as described herein with reference to the first and second aspects of the invention. The pressure plate(s) may slide within a sleeve formed in or in communication with the sealing member. Alternatively, the means for pressurizing the sealing material may be a diaphragm in, or in communication with, a sealing member which is caused to move to pressurize the sealing material.

A further alternative is to provide a screw threaded or other member which can be advanced into the space between the sealing members to pressurize the sealing material.

When a slidable pressure plate or a diaphragm is used then separate means may be required to move the pressure plate or diaphragm so as to pressurize the sealing material. This may be a screw threaded member mounted on a threaded shaft, or may be a resilient biasing means for example a coil spring, or may be a combination of means.

The means for pressurizing the sealing material is preferably such that the sealing material can be depressurized if desired A portion of the means for pressurizing the sealing material which is in contact with the sealing material (for example pressure plate or diaphragm) may, for example, be circular in shape, but other shapes may be used (for example elliptical) if it is desired to maximize the area in contact with the sealing material while allowing the maximum space for the openings for the elongate object or objects.

It is possible to combine the device of the present invention with one according to W090/05401. This provides for some pressurization of the sealing material by movement of a sealing member as a whole with the remaining pressurization being provided in accordance with the present invention. However, it is preferred that there is no relative movement of the sealing members along the elongate object. This enables the sealing members to be designed to give the maximum clamping or sealing effect on the elongate object or objects passing through them. Also, the sealing material need not be put into shear at those regions where sealing is more important. This is also helpful in obtaining the best pressure seal if the sealing device is used in situations in which there is a pressure difference across it, as when it is used in pressurized cable systems.

Where the sealing plate is provided in two or more parts, one, several, or preferably all of the parts may comprise a chamber, a pressure plate and gel. The exact construction that could be used would be apparent to a person skilled in the art to achieve optimum sealing to an elongate object positioned in the hole through the plate.

In a preferred embodiment the device of the invention comprises two or more concentric sealing rings, positioned in use, within the hole in the sealing plate, the rings being removable independently of each other to adapt the hole in the sealing plate to elongate objects of different sizes. The word "rings" is used here to mean any closed loop shape, not necessarily being circular. The actual shape will, of course depend on the shape of the elongate object extending therethrough. Where, as is preferred the sealing plate comprises two or more parts separable along a line or lines which divides the hole, the rings are preferably also in corresponding parts, similarly divided along the said line(s). For example for half shells that are substantially semi-circular in cross-section, rings that are the shape of half a circle in cross-section are preferably used. The rings are preferably provided with cooperating tongue and groove connections in their abutting edge surfaces to hold the rings in concentric arrangement, but to allow the rings to be separated from each other to adapt to different diameter objects. The use of such rings per se is not new, and is described, for example, in U.S. Pat. No. 5,124,507.

A modification of the ring system is preferred specifically for use in this application however. In this modification, each of the rings comprises a flexible flap, separate from the flap on the adjacent rings, and extending to one side of the assembled rings. In the assembled position, the rings are positioned so that the flaps extend into the chamber within the sealing plate. When the device is installed and the sealing material is urged towards the inserted elongate object, the movement of the sealing material causes each flap to be pushed over the adjacent flap and over any gap between the ring from which it extends and the neighbouring ring. It also causes the flap on the innermost ring to be urged, in use, against the elongate object. This can seal across any gap between the elongate object and the innermost rings. Gaps up to about 0.5 mm can be efficiently sealed in this way. This modified ring arrangement is believed to be novel per se.

Accordingly another aspect of the invention provides two or more concentric rings of sealing material, the outermost surface of one ring being releasably secured to the innermost surface of the adjacent ring, and each ring comprising a flap that is separate from the flap on the adjacent rings and extends from one common surface of the concentric rings in a direction away from the plane of the rings, whereby pressure applied towards the said common surface of the rings urges each of the flaps against the adjacent flap towards the said common surface of the rings.

The flaps extending from the rings are preferably arranged to bow in a substantially "u" or "n" configuration to provide optimum sealing. Preferably the free tail end of each flap to one side of the "u" or "n" is longer than the other end (connected directly to the main body of each ring) of each flap. This arrangement optimises sealing.

Any suitable sealing material may be used for the material of the sealing rings, as described in U.S. Pat. No. 5,124,507. One suitable material is rubber.

Where sealing rings are used they are positioned within the hole in the sealing plate. Preferably they project beyond the surface of the sealing plate, and the device additionally comprises a clamping means positionable around the projecting portion of the rings so as to provide strain relief for object(s) passing through the rings. Where the sealing rings are used in an end-plate in combination with a sleeve, the rings may project inwardly or outwardly of the sleeves or both.

Depending on the design and flexibility and strain relief required the rings may be movable a short distance in a direction that is transverse of the elongate object inserted, in use, in the device (for example in a radial direction in the case of a cylindrical elongate object such as a pipe or cable). The rings may be movable about 2-6 mm, for example up to about 4 mm.

The sealing material is provided, according to the invention between the pressure plate, and the elongate object extending through the device. For convenience, it is preferably provided on the pressure plate.

As mentioned above the sealing device according to the invention is preferably used in combination with a sleeve to form a closure device, for example for a splice closure. The device of the invention in this case provides an end plate to the sleeve. The invention provides a means, of sealing the end plate to an elongate object(s) passing through the end plate. Where a sleeve is used in combination with the end plate, a seal is also required between the sleeve and the end plate. The end plate is typically positioned in use within the ends of the sleeve and hence a seal is required between the inner surface of the end of the sleeve and the outer surface of the end plate (the surface defining the thickness of the end plate). In order to achieve this seal the sealing device of the invention is preferably provided with one or more grooves on the surface which defines its thickness. A sealing ring, such as a rubber O-ring or grommet can then be positioned in these grooves to form the seal between the end plate and the sleeve. The sleeve may be sealed at one end so that only a single sealing device is used, through which cables enter and leave the splice, but the preferred form of cable splice comprises an outer sleeve with a sealing device at each end. The sealing devices at each end of the sleeve may be joined together by one or more tie bars to provide the resulting splice case with axial pull strength.

Various forms of sleeve may be used with the sealing device of the present invention, for example wraparound sleeves which are installed after the sealing devices have been installed on the elongate substrate. Suitable sleeves are disclosed in for example WO90/05401. For ease of access to the splice case we prefer that the sleeve be dimensionally-stable, is not dimensionally heat-recoverable.

The invention has been described in terms of one elongate object passing through the sealing plate. It would be obvious to a person skilled in the art how to adapt the number of holes in the sealing plate, the pressure plate, and the chamber to accommodate, and to seal to more than one elongate object.

Any suitable sealing material can be used between the pressure plate and the elongate object. Preferably a sealing material is used having an elongation of at least 100% and a compression set at 70° C. of less than 30%, which More preferably the sealing material has a dynamic storage modulus at 23° C. and at 1 Hz of less than 107 dynes/cm2.

The sealing material preferably has a Stevens-Vollend hardness (as, for example that measured in a Stevens-Vollend texture analyser) of greater than 45 g especially greater than 60 g and an ultimate elongation (ASTM D638) of greater than 60% especially greater than 100%.

The sealing material is preferably one which returns to its original shape when applied pressure is removed. This facilitates removal of the sealing device which may be necessary to obtain access to the elongate object. It may be necessary for example to obtain access to a cable splice case to repair the splice or to add, remove or reorganize conductors within it.

We also prefer that the sealing material have a cohesive strength greater than its adhesive strength to the elongate object and/or to the seal members and means for pressurizing the sealing material.

A particularly preferred material is a gel. By gel is meant a liquid-extended polymer composition preferably having a cone penetration value (measured by a modified version of ASTM D217, as described below) within the range from 30 to 400 (I o-1 millimetres); an ultimate elongation (measured by ASTM D412 as described below) greater than 100%, with substantially elastic deformation to an elongation of at least 100%. The composition may contain three-dimensional cross-linked molecular formations or may merely behave as if it contained such molecular formations (gelloids).

Gel or gelloid compositions may be used comprising a block copolymer having relatively hard blocks and relatively elastomeric blocks (for example hydrogenated rubber blocks) examples of such copolymers including styrene-diene block copolymers (linear or radial) for example styrene-butadiene or styrene-isoprene diblock or triblock copolymers, or styrene-ethylene-butylene-styrene triblock copolymers.

Any of the preferred features for the gel materials described in WO-A-90/05401 may also be useful in the present invention. The entire disclosure of WO-A-90/05401 is incorporated herein by reference.

BRIEF DESCRIPTION OF THE DRAWINGS

Embodiments of the invention will now be described, by way of example, with reference to the accompanying drawings wherein.

DESCRIPTION OF THE PREFERRED EMBODIMENTS

Figure 1:
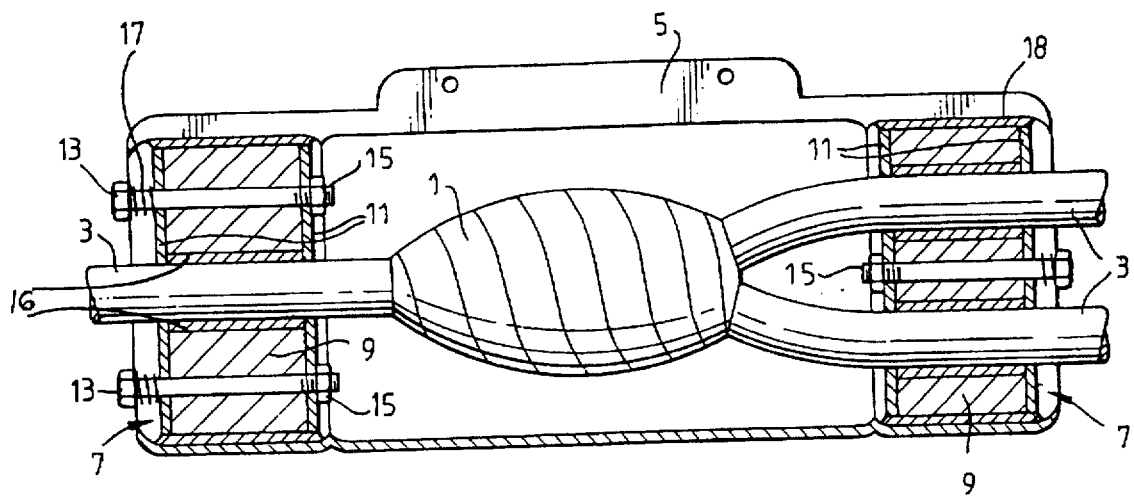
FIG. 1 shows a splice closure assembly according to the prior art.

Referring now to the drawings, FIG. 1 shows a closure assembly according to the prior art surrounding a splice 1 between incoming and exiting cables 3. The closure assembly is provided by a sleeve 5 and end plates 7. Each end plate 7 comprises a sealing material 9 sandwiched between plates 11. Each pair of plates 11 comprises a hole or holes through which the cables 3 can pass. The plates 11 are moveable towards one another, preferably axially with respect to the cable or cables. This movement may be brought about by means of nut and bolt 13 and 15. The result of moving the plates 11 together is to compress the sealing material 9 laterally, which results in it being deformed radially outwardly against the sleeve and/or inwardly against the cable or cables. The embodiment of the prior art also comprises an additional sealing layer 16 adjacent the cables. The deformation of sealing material 9 may be transmitted via sealing material 16 to the cables. If desired resilient means 17 may be provided (optionally on one or more of the bolts 13) to maintain the sealing material 9 and/or 16 under compression.

FIGS. 2 to 5 show embodiments according to the invention of a sealing device which can be used in place of the end plates 7 shown in the prior art of FIG. 1. The device of the invention is advantageous compared to the prior art in that in order to achieve the seal to the cables it is not necessary to move the plates through which the cables pass relative to the cables.

Figure 2:
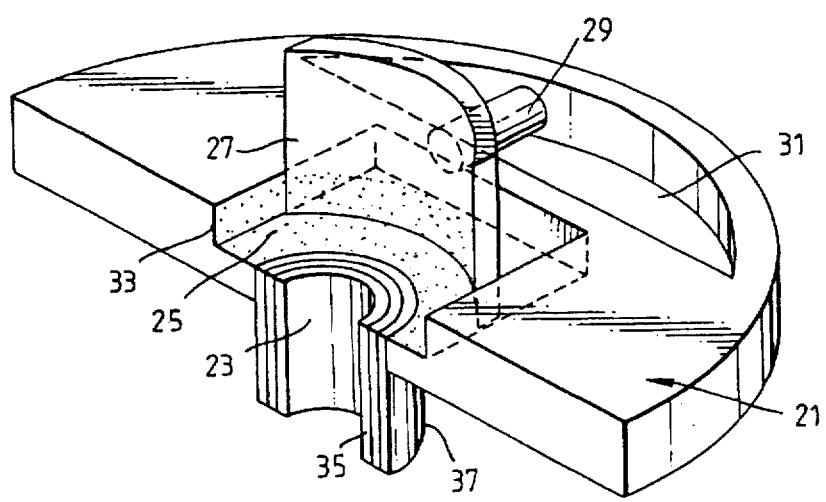
FIG. 2 is a perspective, partly cut away view of one of the half shells of a sealing device according to the invention.

Referring now to the drawings of the present invention. FIG. 2 (which is a partly cut away perspective view of a half-shell of a sealing device according to the present invention), each half-shell of the sealing device of the present invention is a plate 21 that is substantially semi-circular in cross-section, and comprises a channel 23 on its flat surface for receiving a cable. The sealing plate 21 contains a chamber 25 in communication with channel 23. Positioned within the chamber 25 is a pressure plate 27 and a handle 29 attached to the pressure plate 27 extends out of the chamber 25 to a cut away portion 31 in the sealing plate. This enables the pressure plate 27 to be operated, via handle 29 externally of the sealing plate 21. Between the pressure plate 27 and the channel 23 is positioned a gel material 33. The gel 33 is provided on the pressure plate 27. The device also comprises concentric sealing rings 35 surrounding the channel 23 entering the chamber 25. These concentric rings 35 are independently removable to adapt to differing sizes of cable entering.

The pressure plate 27 and the chamber 25 are configured such that when pressure plate 27 is moved by the handle 29 the edges of the pressure plate follow the walls of the chamber 25 so that the gel material 33 is urged towards (he object inserted, in use, in the channel 23. In operation the half-shell as shown in FIG. 2 is of course mated with its corresponding other half around an elongate object prior to movement of the pressure plate 27.

In order to install the pressure plate in the sealing plate, the pressure plate 27 should be positioned in the chamber 25 prior to positioning of the sealing plate half-shells around the elongate object.

Similarly the number of concentric rings 35 around the cables should be adjusted before the half-shells are positioned around the cables.

The concentric rings 35 preferably extend to one side of the sealing plate as shown by reference numeral 37. This enables a strain relief clamp (not shown for clarity) to be positioned around the projecting portion 37 of the concentric rings. The pressure plate 27 may be spring loaded (for example by means of a spring on the handle 29) to maintain a compressive force on the gel 33 even after the installation has been completed. This ensures that the gel is compressed during the life time of the sealing device.

Figure 3:
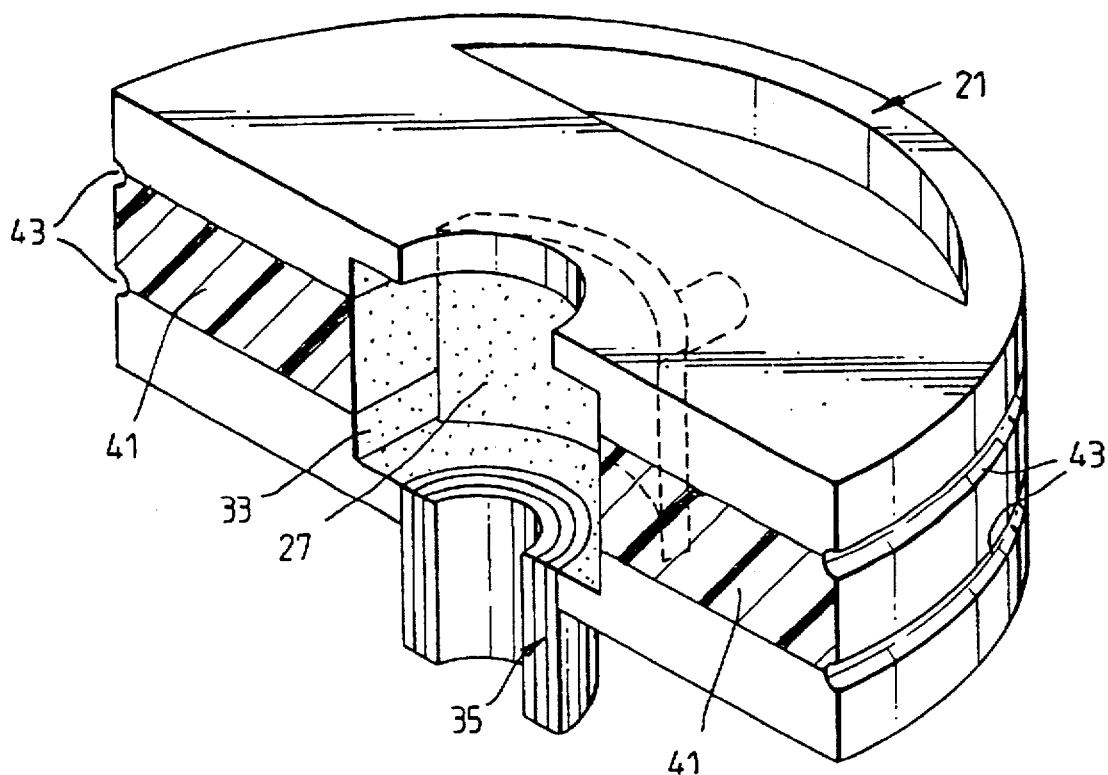
FIG. 3 is a perspective view (not cut away) of the sealing device of FIG. 2 showing additional sealing features.

Referring now to FIG. 3, this shows the sealing plate half-shell of FIG. 2 in non cut-away section. It also shows the additional feature of a gel 41 on the mating flat surfaces of the half-shells of the plate 21, and grooves 43 extending around the semi-circular curved surfaces of the sealing plate half-shell 21. These grooves 43 may accommodate O-rings seals, or the like, to form a seal between the end plate 21 and a sleeve used in combination with the end plate 21 to form the splice closure assembly.

Figure 4:
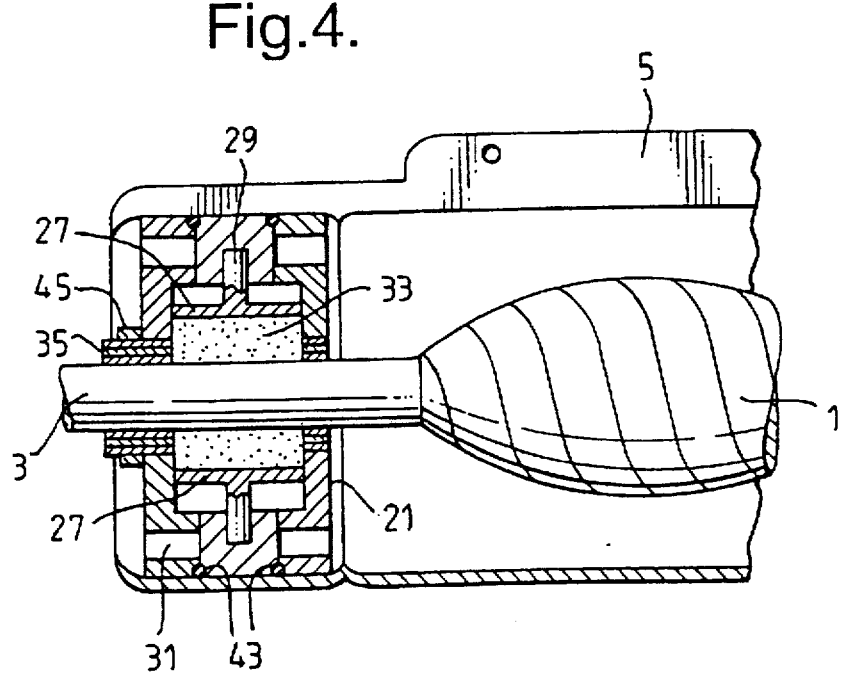
FIG. 4 shows the sealing device of FIGS. 2 and 3 installed around a cable as an end plate in a splice closure assembly.

Turning now to FIG. 4, this shows the sealing plate of FIGS. 2 and 3 installed together with the sleeve in a similar configuration to that shown with reference to the prior art in FIG. 1. As can be seen the gel 33 has been compressed into sealing engagement with the cable 3 entering the splice closure assembly. The strain relief clamp 45 is shown in this diagram positioned around the projecting portion 37 of the concentric sealing rings 35. As shown in FIG. 4 this strain relief is provided externally of the splice closure assembly. It could instead, or in addition, be provided internally, for example on the inwardly facing surface of the sealing plate.

Figure 5:
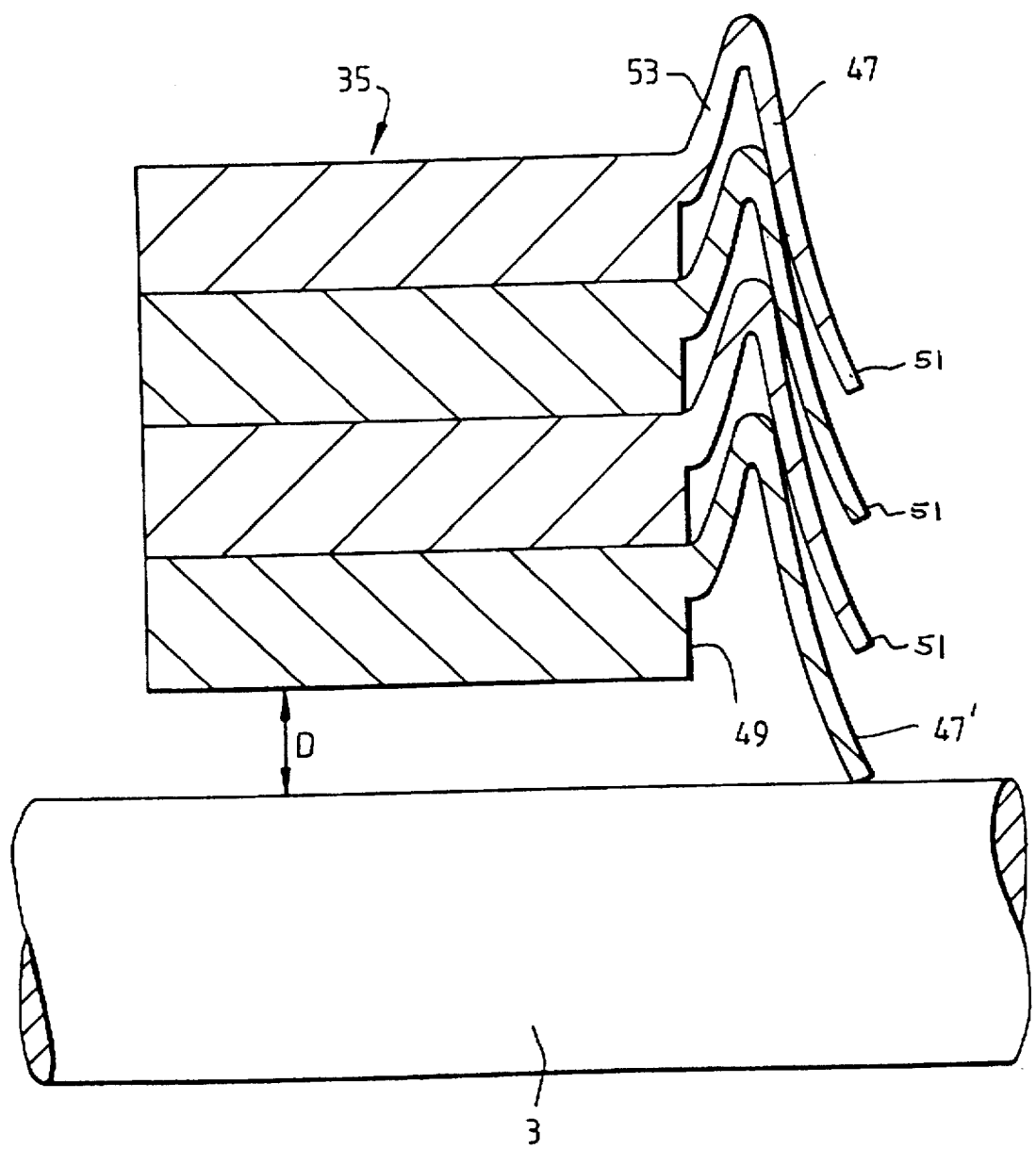
FIG. 5 shows optional sealing features for accommodating and sealing cables of different diameter entering the sealing device of FIGS. 1–4.

Turning to FIG. 5, this is a cross-sectional view shown through a third embodiment of the concentric rings 35 used in the sealing device of the present invention. As shown each sealing ring 35 is provided with a flap 47 extending to one side of the concentric rings. Each flap 47 extends from the common surface 49 of the concentric rings in a direction away from the plane of the rings. Each flap extends substantially in an "n" configuration. The tail of the "n" 51 is substantially longer than the nearer end 53 of flap 47. Each tail 51 extends over the flap of the neighbouring ring. In the present invention the rings are peripherally arranged so that the flaps 47 extend into the chamber 25 in the sealing plate. The result is that when the pressure plate 27 is urged towards the cable, the movement of the gel acts on the flaps 47 pushing the tails of each flap against their neighbour and against the common surface 49 of the concentric rings. A good seal is therefore made across the common surface of the concentric rings. There is therefore no possibility of a leak passed between adjacent ones of the concentric rings.

The flap 47' on the innermost concentric ring also seals against the cable inserted, in use. Thus movement of the gel causes flap tail to seal across any gap between the innermost concentric ring and the cable. This design permits a gap "D" (see FIG. 5) of up to 0.5 mm between the cable and the innermost ring to be effectively sealed.

Figure 6A:
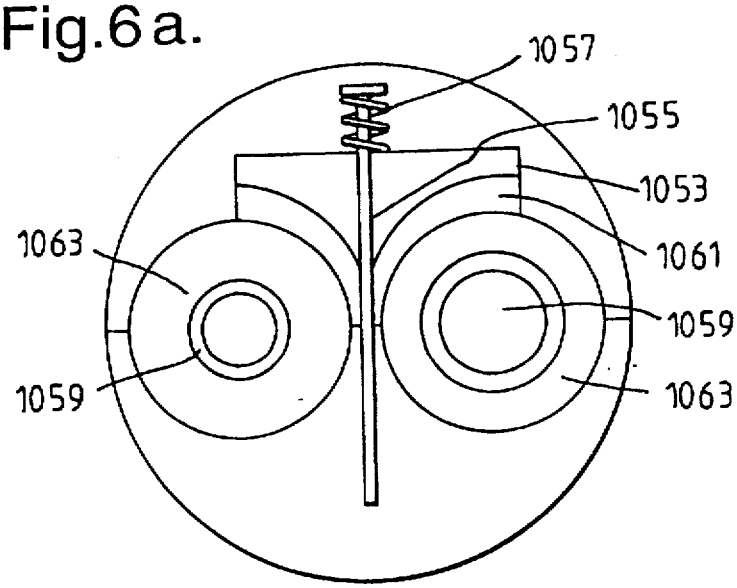
FIGS. 6a and 6b show schematic representations of two preferred forms of sealing device according to the invention.
Figure 6B:
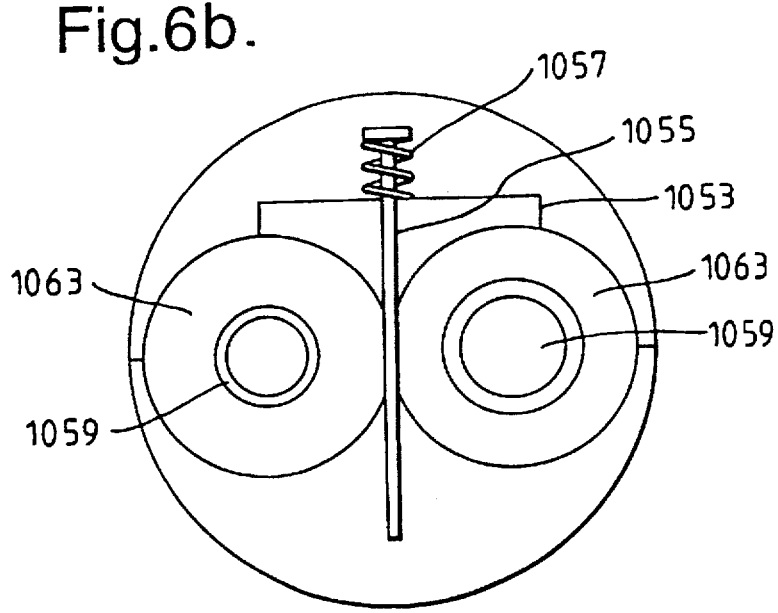

FIGS. 6a and 6b illustrate, schematically, the mechanism of a pressure plate in relation to two different sealing material arrangements. In both arrangements, the sealing material preferably comprises gel, and the pressure plate comprises a pressure part 1053 mounted on a shaft 1055 which extends between the sealing device half pieces. A helical spring 1057 is located on the shaft 1055 to bias the pressure part 1053 towards the sealing material and the cables 1059. In FIG. 6a, some sealing material 1061 (for example gel) is located on a pressure surface of the pressure part (for example the surface facing the cables); there is also some additional sealing material 1063 (for example gel, which is preferably, although not necessarily, the same as gel 1061) located around each cable 1059. This latter sealing material 1063 preferably comprises a strip or tape, most preferably of gel, which has been wound around its respective cable prior to inserting the cable into the sealing device. FIG. 6b shows an alternative arrangement in which substantially all of the sealing material 1063 in the cavity is in the form of tapes or strips, preferably of gel, wound around the cables.

Figure 7:
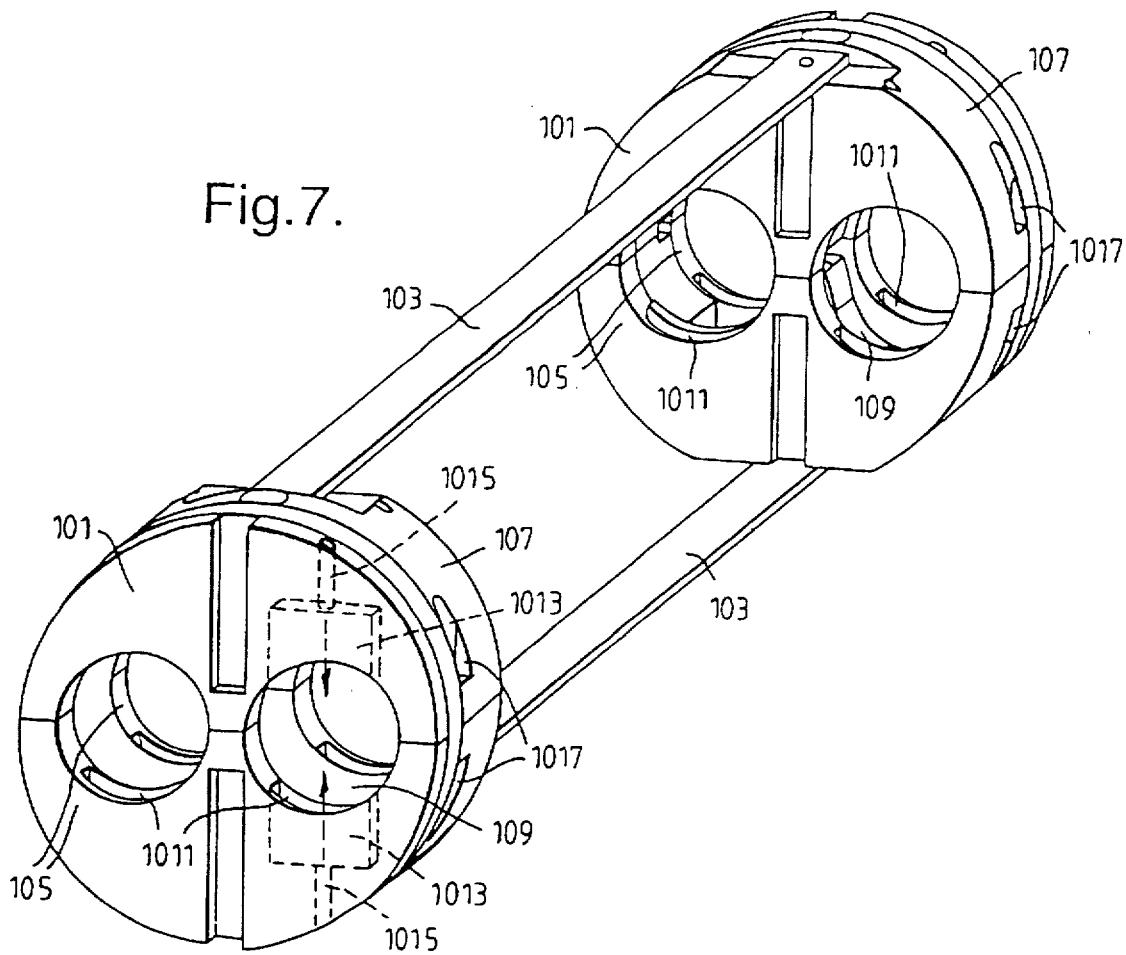
FIG. 7 shows two sealing devices according to the invention arranged as for an in-line splice closure, spaced apart from each other and connected together by two elongate connecting members.

FIG. 7 shows two sealing devices 101 according to the invention arranged for an in-line cable splice closure, for example spaced apart from each other and arranged in line, but connected together by means of two elongate connecting members 103, in the form of bars, extending between them at their peripheries. Each sealing device 101 is hollow and comprises first and second spaced apart end plates 105 and a peripheral, for example circumferential, wall 107 extending between the end plates. The wall 107 substantially encloses the space between the end plates, thereby providing a cavity or chamber 109 in which, at least in use, sealing material, for example gel, (not shown), may be retained. Each sealing device 101 has two cable entry apertures extending through it.

Each sealing device 101, has channels 1011 located in its first and second end plates 105, in each of which a gripping member (not shown) is located in use. The bottom left hand sealing device 101 as drawn shows two of these channels in dotted outline, and also shows arrows illustrating the direction in which the gripping members are moved in order to grip a cable, namely substantially perpendicular to the cable. Each channel 1011 has a relatively wide part 1013 to accommodate a gripping part of the gripping member and a relatively narrow part 1015 to accommodate a threaded shaft of the gripping member. The narrow part 1015 of the channel extends to the periphery of the sealing device so that the shaft may be screwed, from the exterior of the device, further into the sealing device so as to push the gripping part of the gripping member against a cable extending through the sealing device.

Figure 8:
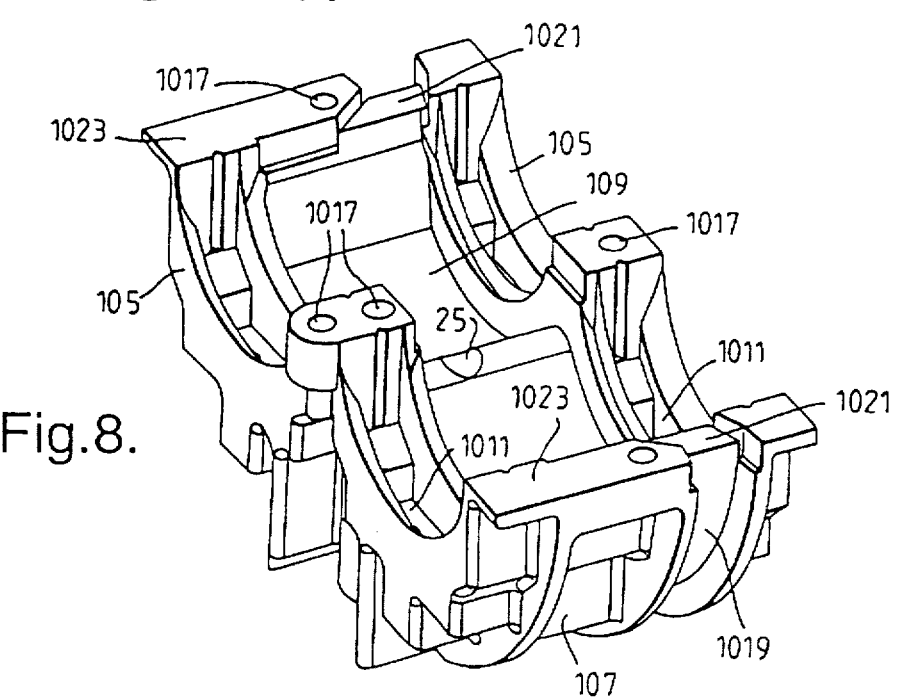
FIG. 8 shows half of a sealing device according to the invention.
Figure 9A:
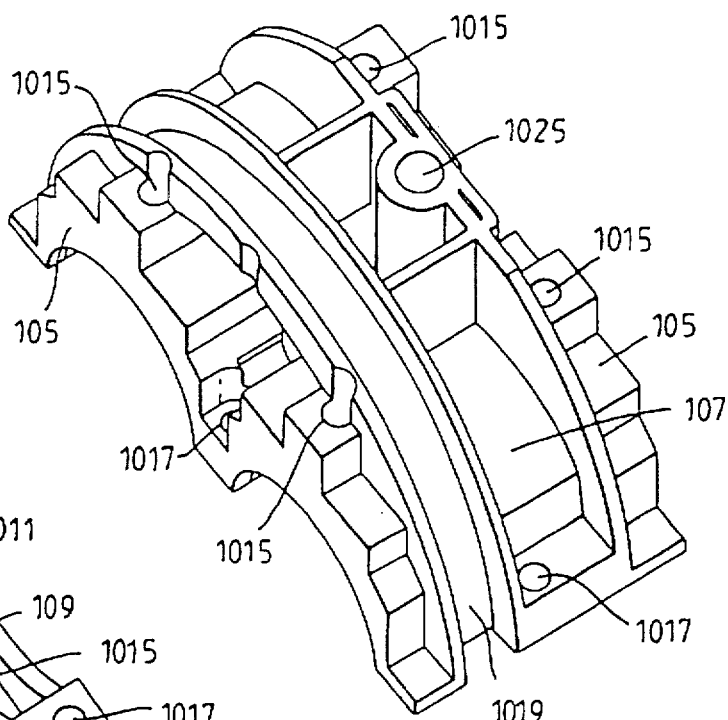
FIGS. 9a and 9b show two views of half of another form of sealing device according to the invention.
Figure 9B:
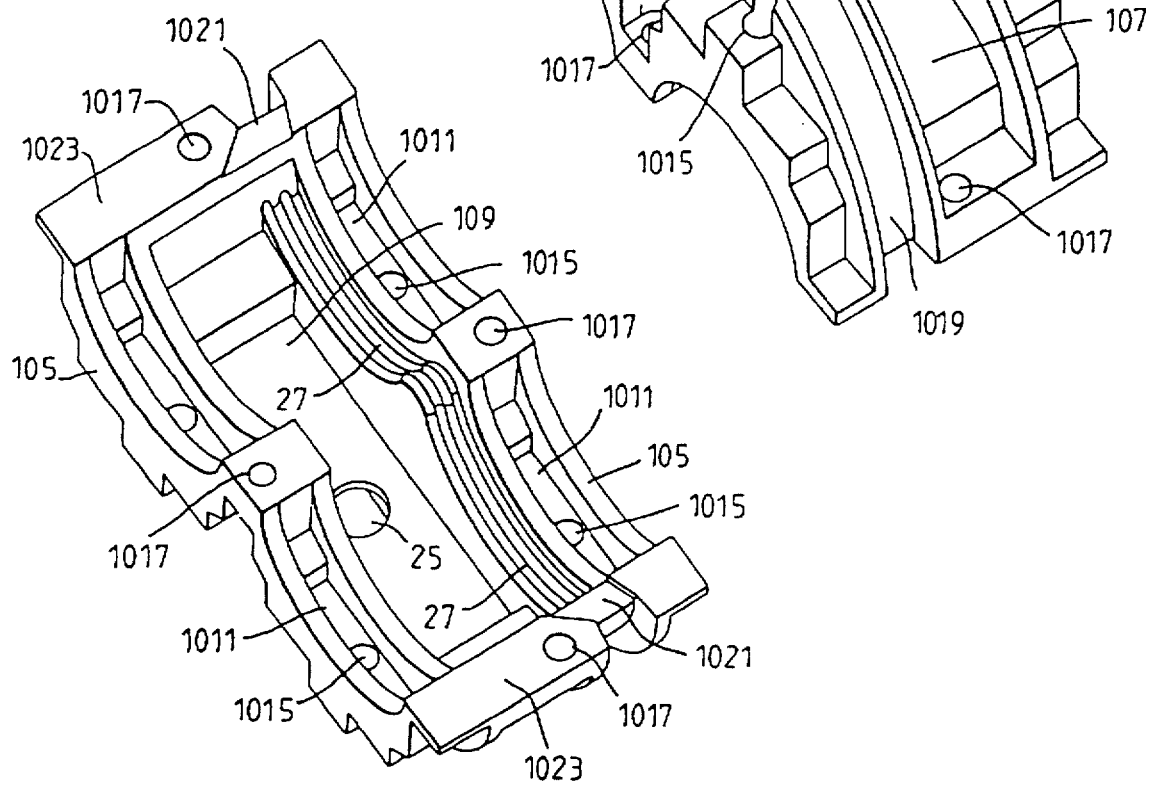
Figure 10:
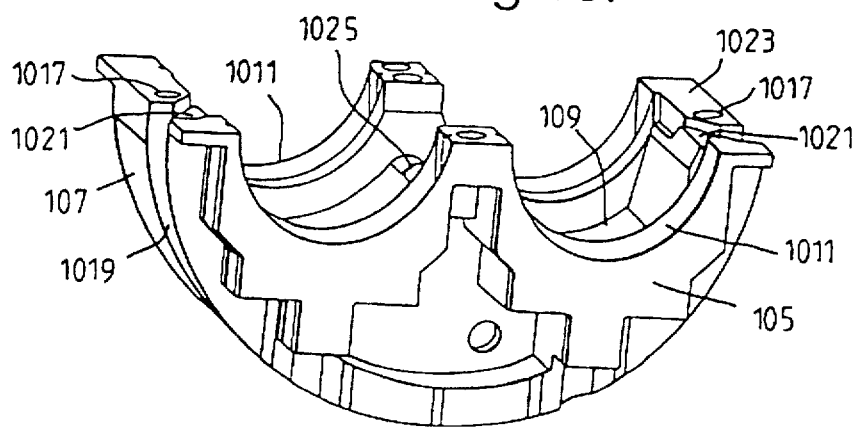
FIG. 10 shows another view of the sealing device half, shown in FIG. 8.

Each sealing device 101 comprises two major parts (half pieces as shown) which are separable in a plane extending substantially coplanar with the cables which extend, in use, through the device. The half pieces are bolted together at points 1017. FIGS. 8 to 10 show a variety of views of two different, but similar sealing device half pieces: FIGS. 8 and 10 show two views of one form of sealing device and FIGS. 9a and 9b show two views of another, more preferred, form of sealing device. Each half piece is bolted to its mating half piece through holes 1017. End plates 105, peripheral walls 107, cavities 109, and channels 1011 (and narrow parts 1015) are shown. The periphery of each half piece has a substantially semi-circular channel or groove 1019 (which forms a substantially circular channel or groove in the assembled sealing device) for an O-ring seal. The O-ring (which may for example be formed from an elastomeric material, especially rubber) forms a seal between the sealing device and the housing of the splice closure. Each of the half pieces have windows (for example gaps) 1021 communicating between the cavity 109 and the channel 1019, through which, in use, extends sealing material from the cavity. These windows generally have a dual function: firstly they enable the sealing material to form a seal which substantially blocks longitudinal passage of fluid (for example moisture or gas) between mating faces 1023 of each half piece; secondly they enable the sealing material to contact the sealing O-ring, thereby forming a good seal at each so-called triple point, for example where the longitudinal seal for the sealing device (provided by the sealing material in the window) meets the circumferential seal for the sealing device (provided by the 0ring).

The sealing device half pieces of FIGS. 8 to 10 are shown without their respective pressure plates which, in use, are moved towards the cables to urge the sealing material (also not shown) against the cables. However, passageways 1025 communicating between the cavity of each device and the exterior of the device are shown. Each passageway accommodates, in use, a threaded shaft connected to the pressure plate for screwing the pressure plate towards the cables.

The cavity of the sealing device of FIG. 9b has a region 27 of alternating ridges and grooves adjacent to one of its end plates. These ridges and grooves increase the path length along which any moisture ingressed between the body portion of the sealing device and the sealing material would have to travel in order to pass through the sealing device and into the splice closure. They therefore provide an extra barrier against ingress of moisture.

Figure 11:
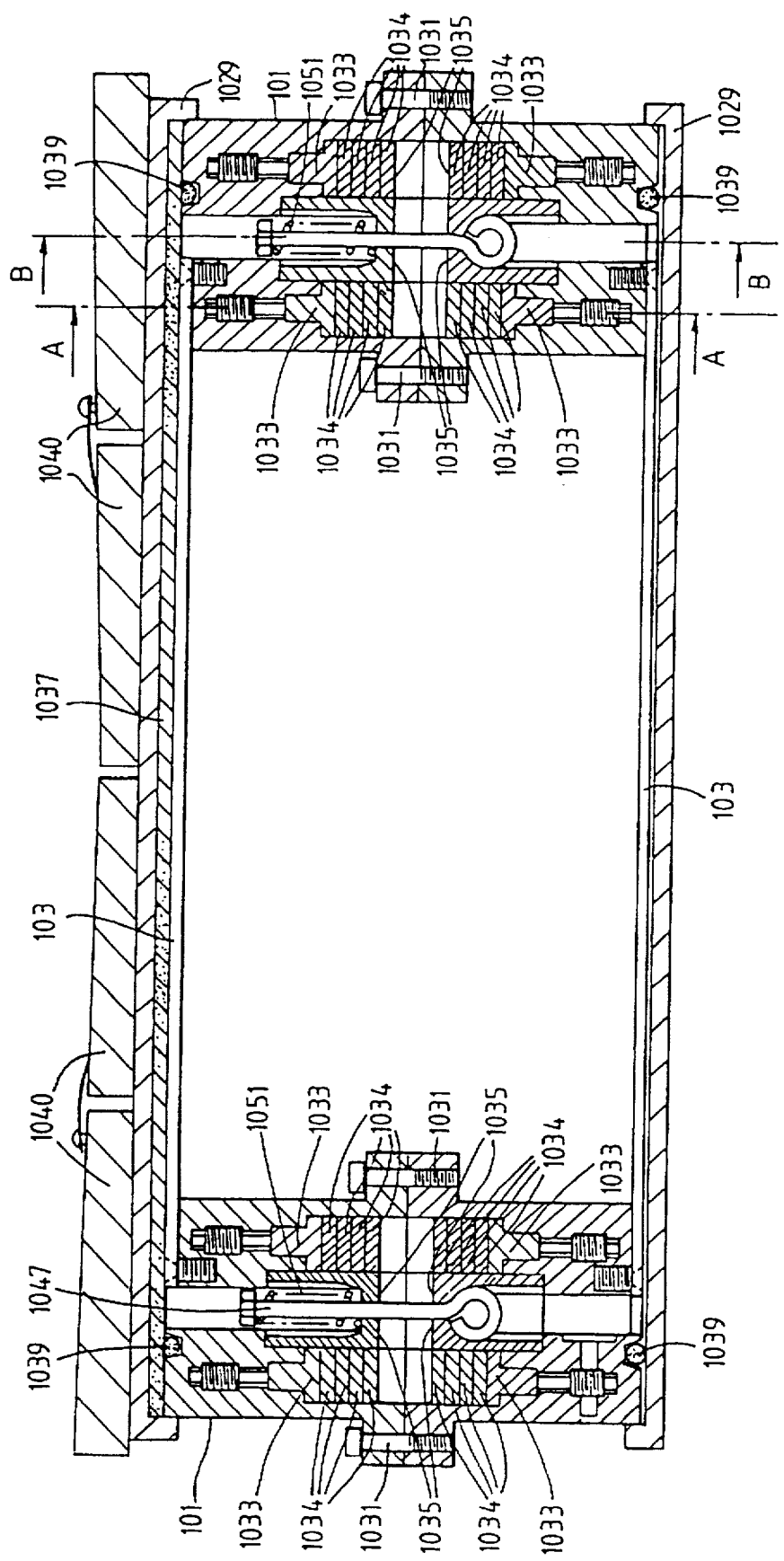
FIG. 11 shows, in cross-section, an assembled cable splice closure according to the invention.

FIG. 11 shows, in cross-section, an assembled in-line cable splice closure according to the invention. The closure comprises two sealing devices 101, each located at an end of a substantially cylindrical housing 1029. Connecting bars 103 extend between and interconnect the two sealing devices. In this embodiment, each sealing device has bolts 1031 which join the two half pieces of each sealing device together. Pairs of gripping members 1033 are located in the end plates of each sealing device, and wound spirally between the gripping members of each pair, in a cable entry aperture, is a retention strip 1034. Each sealing device also has a pressure plate 1035 located in its central cavity. Each pressure plate has a resilient member in the form of a helical spring 1051 mounted on a shaft 1047 thereof, to bias the pressure plate against the sealing material.

The housing 1029 is wraparound and has a longitudinally extending opening provided with a longitudinal seal 1037, which contacts O-rings 1039 located around the sealing devices. The housing 1029 is preferably closed by means of closing members 1040 which have wedge-shaped channels which are slid onto wedge-shaped rails (not shown) on the outside of the housing. Any other suitable way of closing the housing could, of course, be used.

Figure 12:
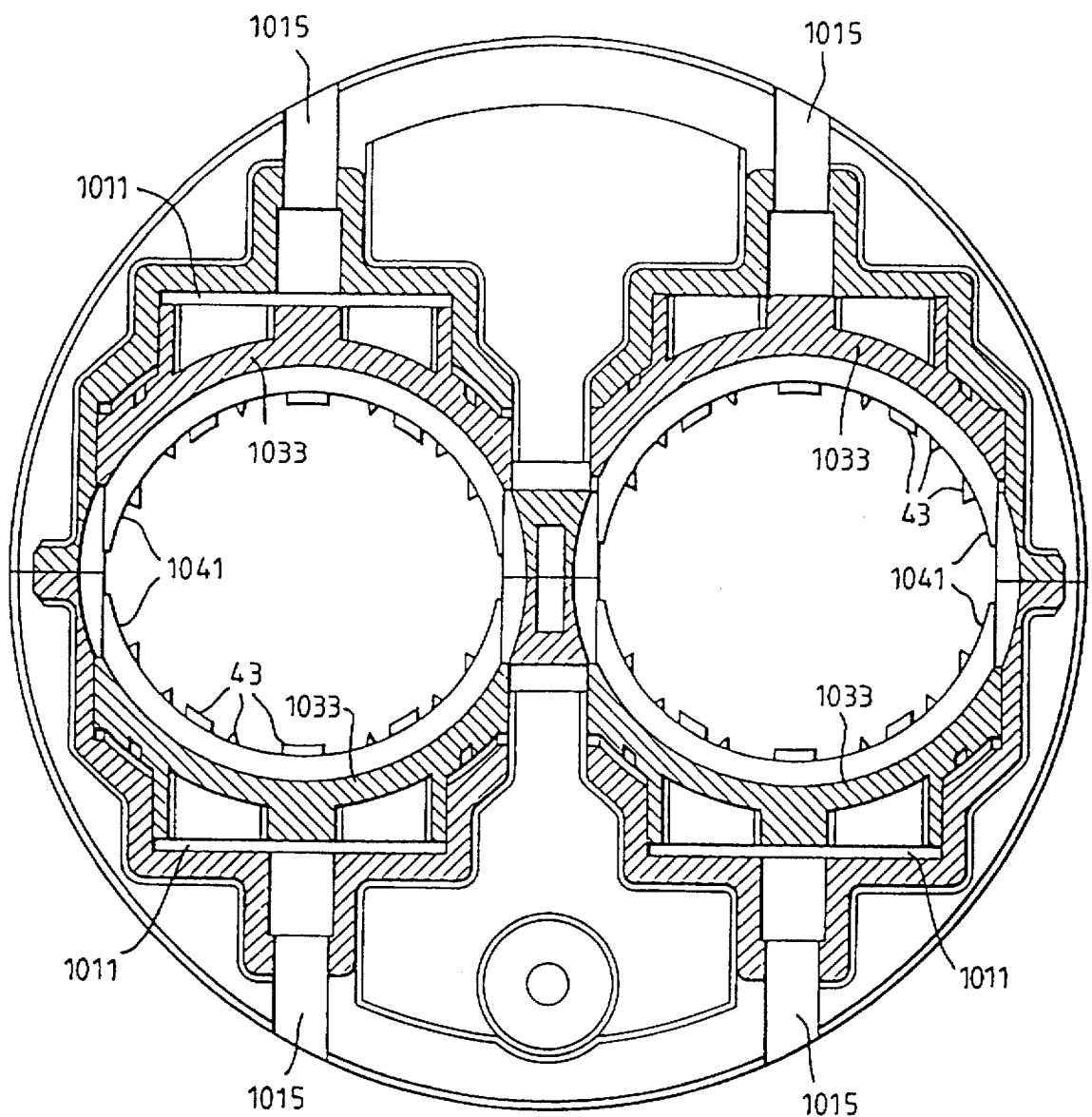
FIG. 12 shows one of the sealing devices of the closure shown in FIG. 11 in cross-section A—A.

FIG. 12 shows one of the sealing devices of the splice closure shown in FIG. 11, in cross-section A—A. This cross-section illustrates the gripping members 1033 of the sealing device, movably located in channels 1011. Each gripping member 1033 has an arcuate gripping surface 1041 provided with gripping protrusions 43.

Figure 13:
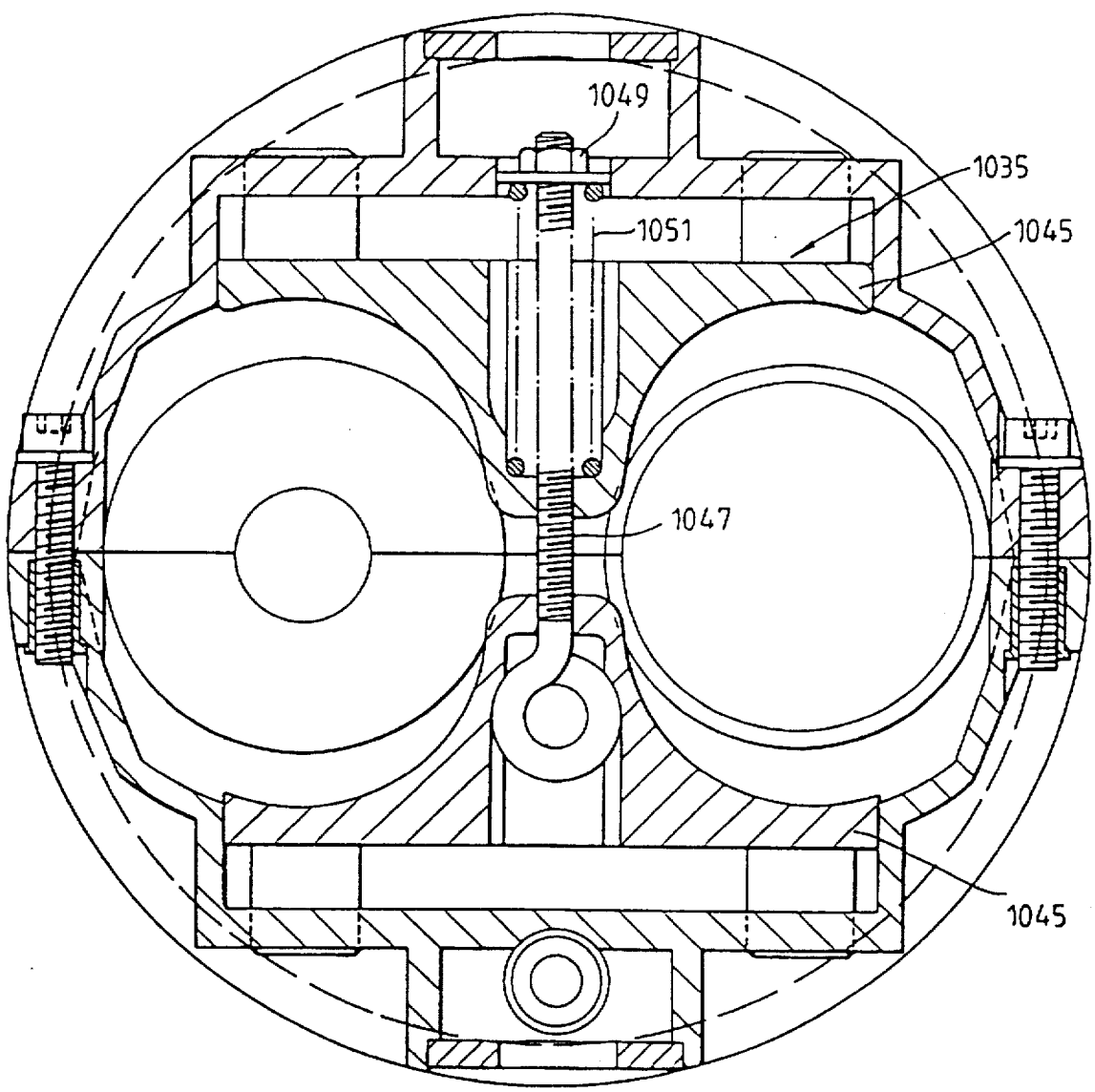
FIG. 13 shows the sealing device of FIG. 11 in cross-section B—B.

FIG. 13 shows the sealing device of FIG. 11 in cross-section B—B. This cross-section illustrates the pressure plate 1035 comprising two pressure parts 1045 mounted on a shaft 1047 extending between the two sealing device half pieces. Tightening the nut 1049 on the shaft 1047 forces the two pressure parts 1045 towards each other and consequently, in use, towards the cables extending into the closure. The shaft 1047 has a helical spring 1051 located on it, to bias the pressure parts 1045 towards each other.

Figure 14:
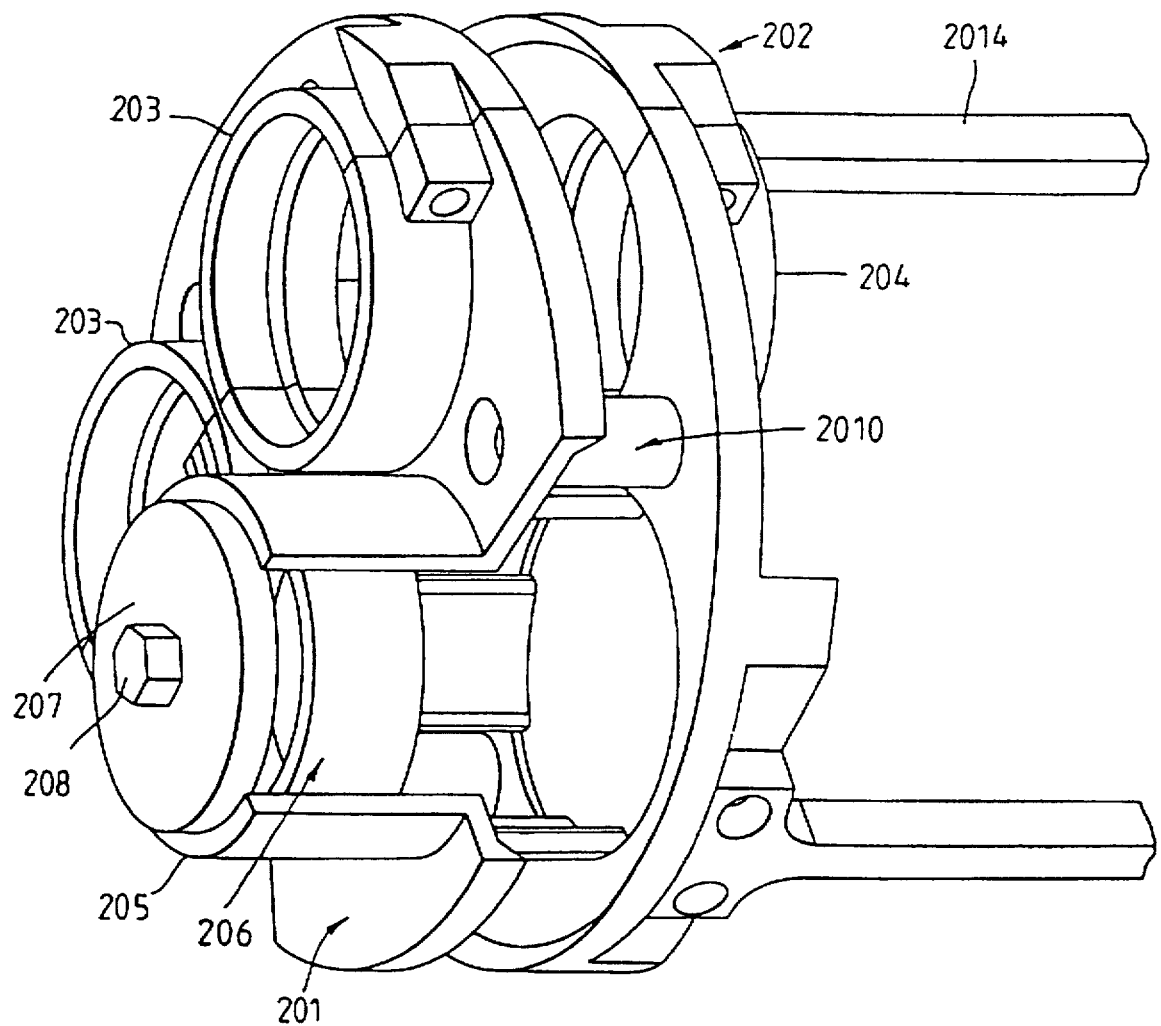
FIG. 14 is a perspective view, partly cut away, of the two sealing members of another form of sealing device according to the invention (for example according to the third aspect of the invention)

The sealing device of FIG. 14 comprises an outer sealing member (201), and an inner sealing member (202). Sealing member (201) has openings (203) which register with corresponding openings (204) in sealing member (202). An outwardly projecting sleeve (205) on sealing member (201) contains a piston or diaphragm (206). This piston is retained in sleeve (205) by cap (207) which is provided with a nut (208). Cap (207) is threaded at its periphery as can be more clearly seen in FIG. 15. A helical coil or other spring (209) may be retained between piston (206) and cap (207) to provide spring-loading. The force exerted by the spring on the piston can be adjusted by screwing the cap in or out of the sleeve using the nut (208) and a spanner. The spring, which preferably comprises a metal, provides a permanent resilient bias on the sealing material, compensating for any creep or compression set over the life-time of the product.

As can be seen from FIG. 14, spacing cylinders (2010) are provided between sealing members (201) and (202) to keep them at a pre-determined distance from each other, and to increase the rigidity of the device.

Figure 15:
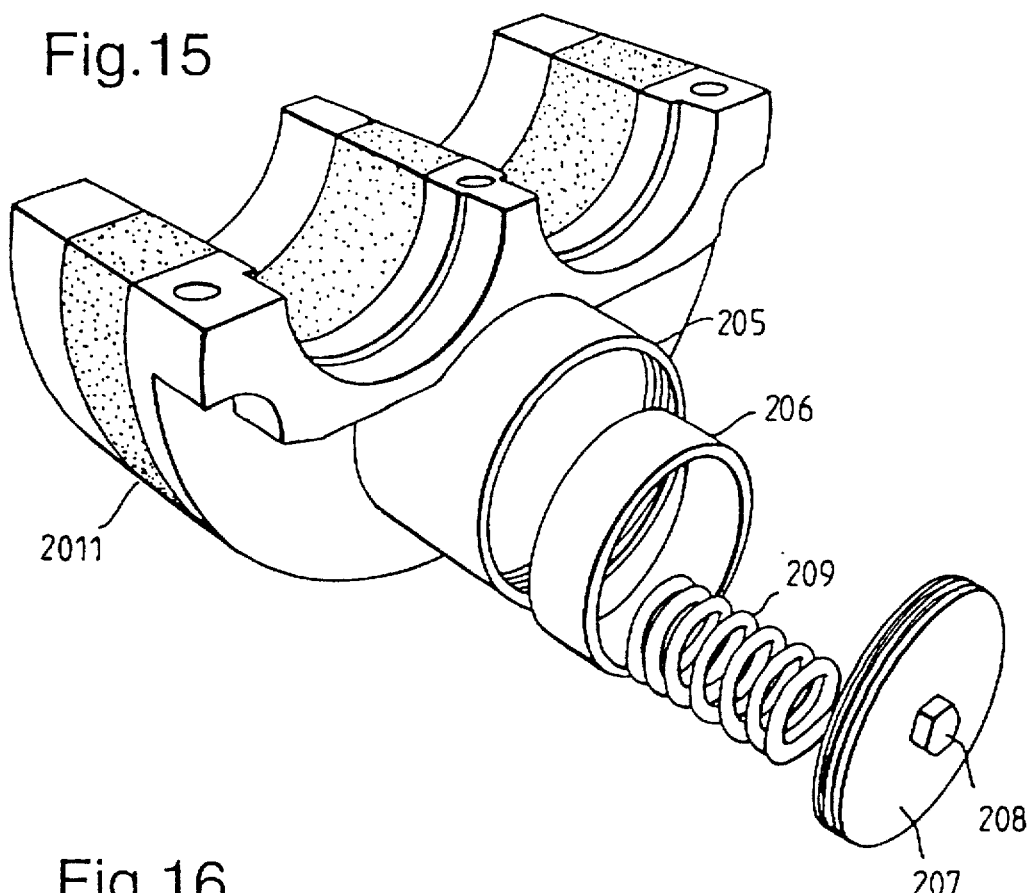
FIG. 15 is a perspective view partially exploded, of half of a sealing device similar to that of FIG. 14.
Figure 16:
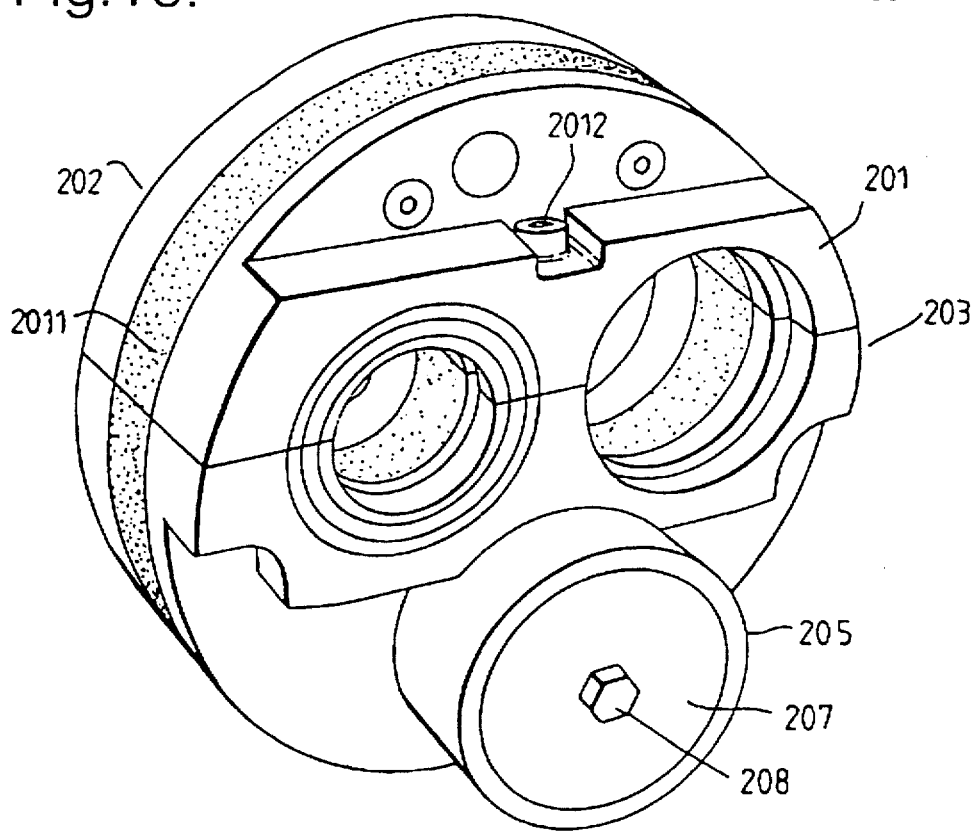
FIG. 16 is a perspective view of a sealing device similar to those of FIGS. 14 and 15.
Figure 17:
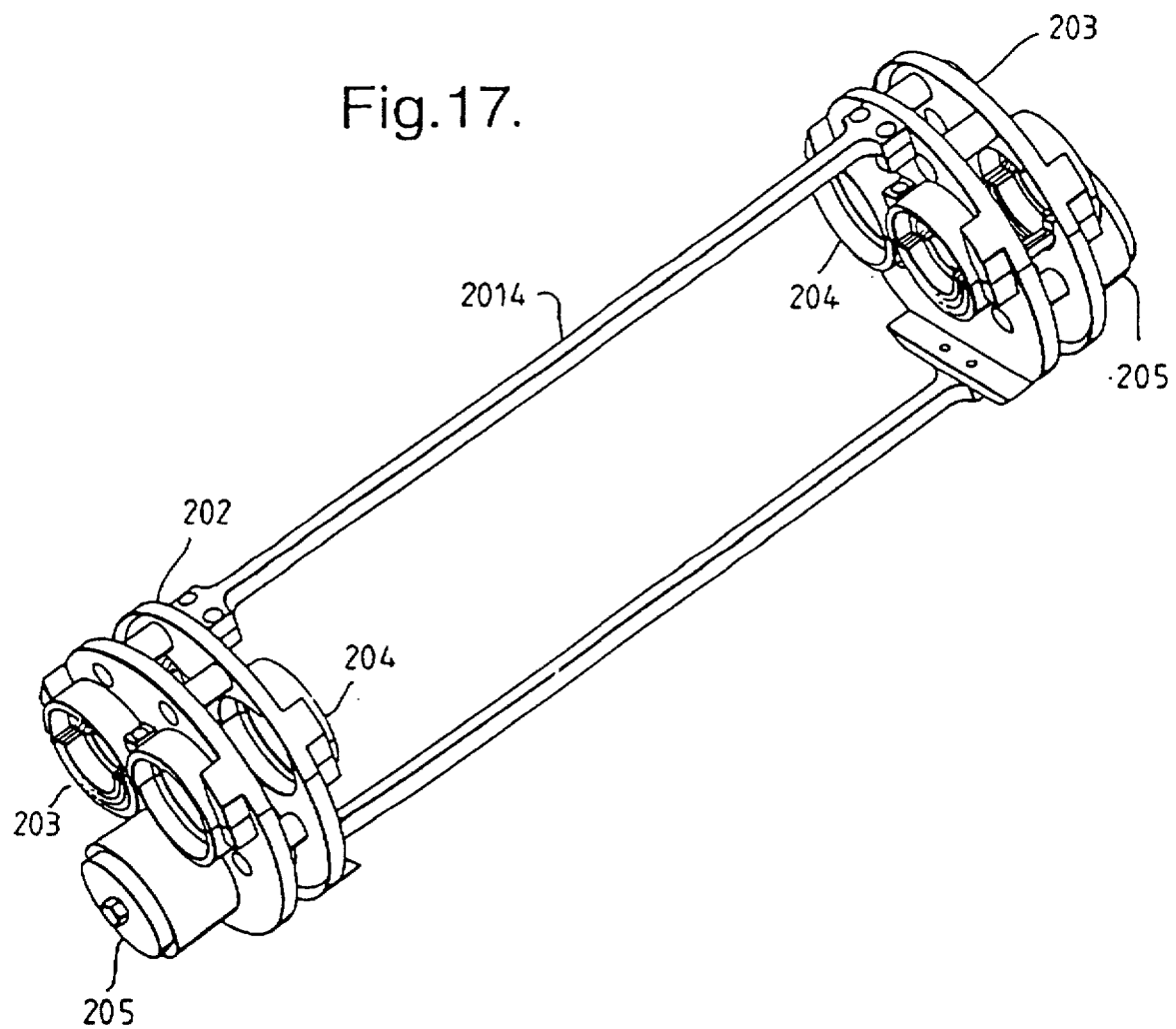
FIG. 17 is a perspective view of two sealing devices (similar to those shown in FIGS. 14 to 16) with tie bars, but without sealing material, around which a sleeve can be fitted to form a splice case.

As shown in FIG. 15, a gel or other sealing-material (2011) is provided between the sealing members (201) and (202). The sealing material is shaped so as to provide openings for cables corresponding to openings (203) and (204) in sealing members (202) and (201). FIG. 15 shows a slight y different form of sealing device from that shown in FIG. 14 in which the sleeve (205) is not integral with outer sealing member (201) but fits within an opening within sealing member (201).

The sealing device may be made in at least two parts each comprising a portion of the sealing member (201), sealing member (202) and sealing material (2011). These may be fitted around cables passing through the openings (203) and (204), and held together by screws (2012).

The openings (203) and (204) may be adapted for use with different size cables by removable inserts within the openings, which serve to support the cables and/or retain the sealing material.

A pair of sealing devices may be positioned around cables on either side of a splice and held together by removable tie bars (2014).

A cylindrical sleeve or other casing may then be positioned around the sealing members and tie bars.

If necessary the inside dimension of the sleeve may be adjusted to the outside dimension of the sealing members by an O-ring or other suitable sealing member.

The gel sealing material between the inside and outside sealing members is then pressurized by screwing in the cap (207) so pressurizing the spring (209) and so forcing the piston (206) into the sealing material (2011). The sealing material is displaced so as to form a close seal around the cables passing through the openings in the sealing devices and with the sleeve (not shown) surrounding the cable.

We claim:

1. An end plate for forming a seal around an elongate object comprising:
   (a) a sealing plate comprising first and second sealing members, each having a hole through which the object can pass, said first and second sealing members defining therebetween a chamber in communication with said holes in said first and second sealing members, said sealing plate adapted to be sealed, in use, within the ends of a sleeve shaped member to provide at least part of a closure assembly;
   (b) a pressure plate positioned within and movable relative to the chamber; and
   (c) a sealing material positioned within the chamber between said sealing members such that when the elongate object passes, in use, through the holes in the first and second sealing members, the sealing material is positioned between the pressure plate and the elongate object;
   wherein the pressure plate can be moved, in use, towards the object in a direction transversely of the object, to urge the sealing material into sealing contact with the object.

2. An end plate according to claim 1, wherein the chamber surrounds at least part of a periphery of the hole.

3. An end plate according to claim 1, wherein the sealing plate comprises two or more parts, separable along a line that divides the holes in said first and second sealing members.

4. An end plate according to claim 1, wherein the pressure plate is operable by hand externally of the device.

5. An end plate according to claim 1, comprising a resilient member arranged resiliently to bias the pressure plate against the sealing material.

6. An end plate according to claim 1, wherein the pressure plate has side edges and wherein the configuration of the pressure plate and the chamber are such that as the pressure plate is moved towards the elongate object, the side edges of the pressure plate substantially follow inner walls of the chamber.

7. An end plate according to claim 6, wherein the sealing material comprises gel.

8. An end plate according to claim 1, comprising two or more concentric sealing rings, positioned in use, within the holes in the first and second sealing members, the rings being removable independently of each other to adapt the holes in the first and second sealing members to elongate objects of different sizes.

9. An end plate according to claim 8, wherein the sealing plate has two major surfaces, and edges connecting the two major surfaces, and the sealing rings project beyond one of the two major surfaces of the sealing plate to form a projecting portion, and the device additionally comprises a clamping means positionable around the projecting portion of the rings so as to provide strain relief for objects passing through the rings.

10. An end plate for forming a seal around an elongate object comprising:
   (a) a sealing plate comprising first and second sealing members, each having a hole through which the object can pass, said sealing plate being adapted to be sealed, in use, within the end of a sleeve shaped member to provide at least part of a closure assembly, said first and second sealing members defining therebetween a chamber in communication with said holes in said first and second sealing members, and surrounding at least part of a periphery of each hole;
   (b) a pressure plate positioned within and movable relative to the chamber; and
   (c) a sealing material positioned within the chamber between said sealing members such that when the elongate object passes, in use, through the holes in the first and second sealing members, the sealing material is positioned between the pressure plate and the elongate object;
   wherein the pressure plate can be moved, in use, to urge the sealing material into sealing contact with the object.

11. A closure assembly for forming a seal around an elongate object, comprising a sleeve and two end plates each comprising:
   (a) a sealing plate comprising first and second sealing members, each having a hole through which the object can pass, said first and second sealing members defining therebetween a chamber in communication with said holes in said first and second sealing members, said sealing plate being adapted to be sealed, in use, within the ends of the sleeve;
   (b) a pressure plate positioned within and movable relative to the chamber; and
   (c) a sealing material positioned within the chamber between said sealing members such that when the elongate object passes, in use, through the holes in the first and second sealing members, the sealing material is positioned between the pressure plate and the elongate object;
   wherein the pressure plate can be moved, in use, towards the object in a direction transversely of the object, to urge the sealing material into sealing contact with the object.

12. An end plate for forming a seal around an elongate object, comprising:
   (a) a sealing plate which:
      (I) comprises first and second sealing members each having at least one aperture defining a path for an elongate object through the sealing device; and
      (II) is adapted to be sealed, in use, within the ends of a sleeve shaped member to provide at least part of a closure assembly;
   (b) a sealing material between the sealing members; and
   (c) means for pressurizing the sealing material wherein the means for pressurizing the sealing material can act without moving the sealing members relative to the elongate object.

* * * * *

UNITED STATES PATENT AND TRADEMARK OFFICE
CERTIFICATE OF CORRECTION

PATENT NO. : 5,789,707
DATED : Aug. 4, 1998
INVENTOR(S) : Damm et al.

It is certified that error appears in the above-identified patent and that said Letters Patent is hereby corrected as shown below:

Column 4, Line 27 Insert new paragraph at: "A portion..."
Column 5, Line 20 replace "causes" by -- urges --
Column 7, Line 31 insert "i.e." between "closure," and "spaced"
Column 7, Line 44 replace "11" by -- 12 --
Column 8, Line 46 replace "(he" by -- the --
Column 9, Line 25 replace "47" by -- 17 --
Column 9, Line 34 replace "47" by -- 17 --
Column 9, Line 56 replace "part" by -- plate --

Signed and Sealed this

Fourth Day of May, 1999

Attest:

Q. TODD DICKINSON

*Attesting Officer*          Acting Commissioner of Patents and Trademarks